United States Patent [19]
Hori et al.

[11] Patent Number: 5,150,434
[45] Date of Patent: Sep. 22, 1992

[54] IMAGE DATA FILING SYSTEM WITH IMAGE DATA MODIFICATION FACILITY

[75] Inventors: Osamu Hori; Akio Okazaki, both of Yokohama; Shigeyoshi Shimotsuji, Kawasaki, all of Japan

[73] Assignee: Kabushiki Kaisha Toshiba, Kawasaki, Japan

[21] Appl. No.: 774,155

[22] Filed: Oct. 15, 1991

Related U.S. Application Data

[63] Continuation of Ser. No. 529,355, May 29, 1990, abandoned.

[30] Foreign Application Priority Data

May 31, 1989 [JP] Japan .................... 1-135801

[51] Int. Cl.⁵ .............................................. G06K 9/03
[52] U.S. Cl. ...................................... 382/57; 382/47; 382/61; 364/943.1; 364/DIG. 2
[58] Field of Search ............... 382/47, 57, 61; 358/452; 364/917.96, 943.1

[56] References Cited

U.S. PATENT DOCUMENTS

| | | | |
|---|---|---|---|
| 3,611,291 | 10/1971 | Frank | 382/57 |
| 4,121,196 | 10/1978 | Johnson et al. | 382/41 |
| 4,553,261 | 11/1985 | Froessl | 382/57 |
| 4,633,506 | 12/1986 | Kato | 382/41 |
| 4,691,238 | 9/1987 | Yamada | 382/47 |
| 4,827,330 | 5/1989 | Walsh et al. | 382/57 |

*Primary Examiner*—Leo H. Boudreau
*Assistant Examiner*—David Fox
*Attorney, Agent, or Firm*—Foley & Lardner

[57] ABSTRACT

An image data filing system capable of facilitating an easy and accurate modification on the image filed in the system, without demanding a cumbersome operation for an operator. In the system, the image is modified by specifying an image to be modified among images filed in the system; displaying the specified image to be modified; specifying a region to be modified on the displayed image to be modified; obtaining a hard copy of the specified region to be modified; making a modification on the obtained hard copy of the specified region to be modified to obtain an modified image; and entering the modified image obtained on the hard copy into the system.

4 Claims, 9 Drawing Sheets

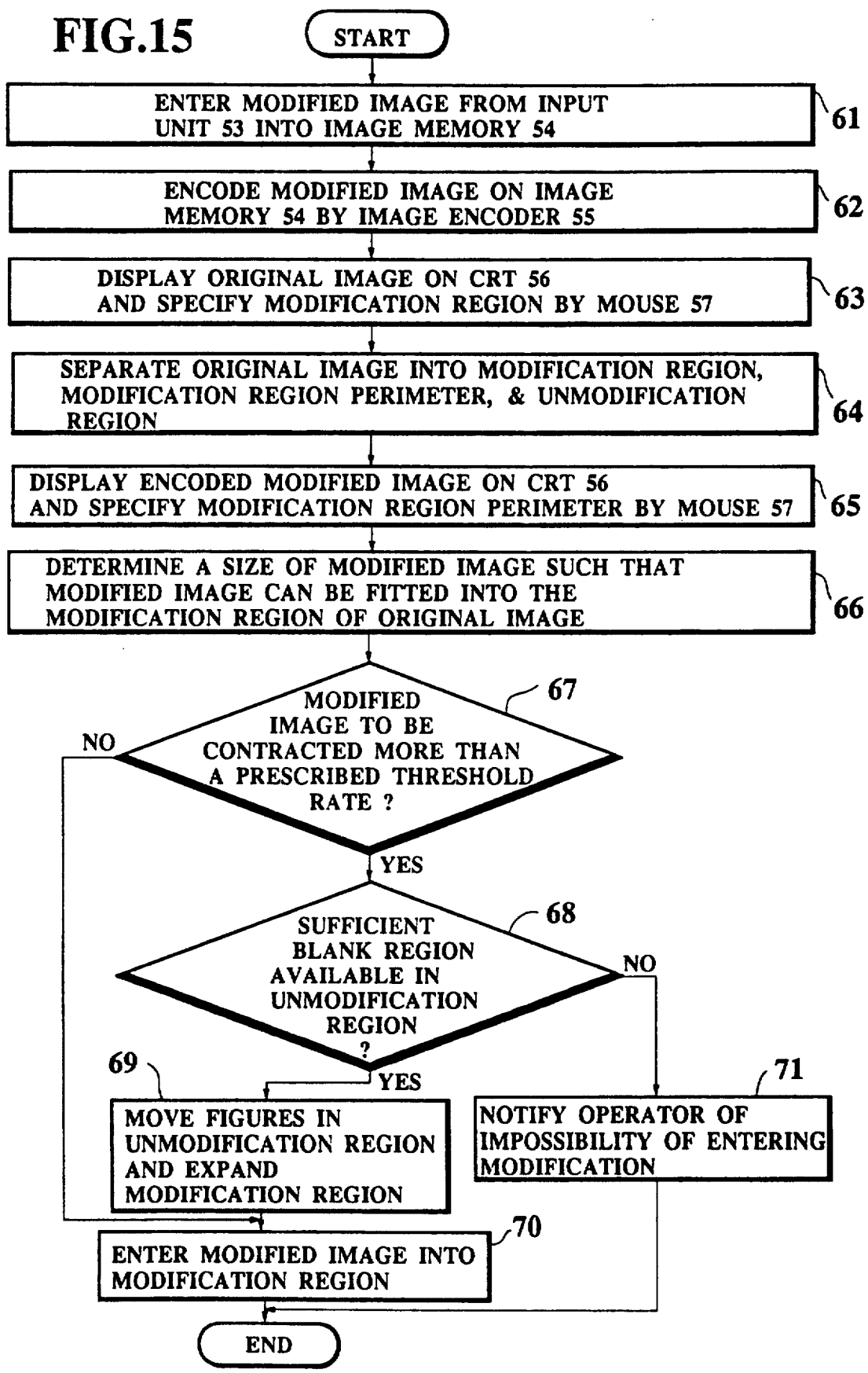

IMAGE DATA FILING SYSTEM WITH IMAGE DATA MODIFICATION FACILITY

This application is a continuation of application Ser. No. 07/529,355, filed May 29, 1990, now abandoned.

BACKGROUND OF THE INVENTION

1. Field of the Invention

The present invention relates to image data modification in an image data filing system for administering image data as coded data.

2. Description of the Background Art

An image data filing system for administering image data such as design drawings, documents, pictures, and maps in the form of coded data to be handled by a computer has come to be widely used in recent years. In such an image data filing system, it is necessary to accommodate modifications such as insertions and corrections, to be made on a particular portion of a particular image among a multiplicity of images filed in the system.

Conventionally, this has been achieved in one of the following ways.

A first manner is to make a modification on an original uncoded image, coding the modified image, and replacing the coded data before the modification with the coded data after the modification. However, in an image data filing system, the original image is normally not retained after the image had been coded and filed, so that this manner is scarcely used in a presently available image data filing system.

A second manner is to make a modification on a displayed image by means of a pointing device such as a light pen. However, it has been difficult for an average operator to maneuver such a pointing device with sufficient skills. In a case of computer aided designing (CAD), an operator has to specify a position to make a modification by means of a cursor on the displayed image, and, then, perform an operation to enter the desired modification, which is a quite tedious procedure.

SUMMARY OF THE INVENTION

It is therefore an object of the present invention to provide an image data filing system capable of facilitating an easy and accurate modification on the image filed in the system, without demanding any cumbersome operations for an operator.

According to one aspect of the present invention there is provided a method of modifying data in an image data filing system, comprising the steps of: specifying an image to be modified among images filed in the system; displaying the specified image to be modified; specifying a region to be modified on the displayed image to be modified; obtaining a hard copy of the specified region to be modified; making a modification on the obtained hard copy of the specified region to be modified to obtain an modified image; and entering the modified image obtained on the hard copy into the system.

According to another aspect of the present invention there is provided an image data filing system, comprising: means for storing image data of images filed in the system; means for specifying an image to be modified among images filed in the system; means for displaying the specified image to be modified; means for specifying a region to be modified on the displayed image to be modified; means for obtaining a hard copy of the specified region to be modified on which a modification is to be made in order to obtain an modified image; and means for entering the modified image obtained on the hard copy into the system.

Other features and advantages of the present invention will become apparent from the following description taken in conjunction with the accompanying drawings.

BRIEF DESCRIPTION OF THE DRAWINGS

FIG. 15 is a flow chart for the operation of the image data filing system of FIG. 14.

DETAILED DESCRIPTION OF THE PREFERRED EMBODIMENTS

Figure 1:
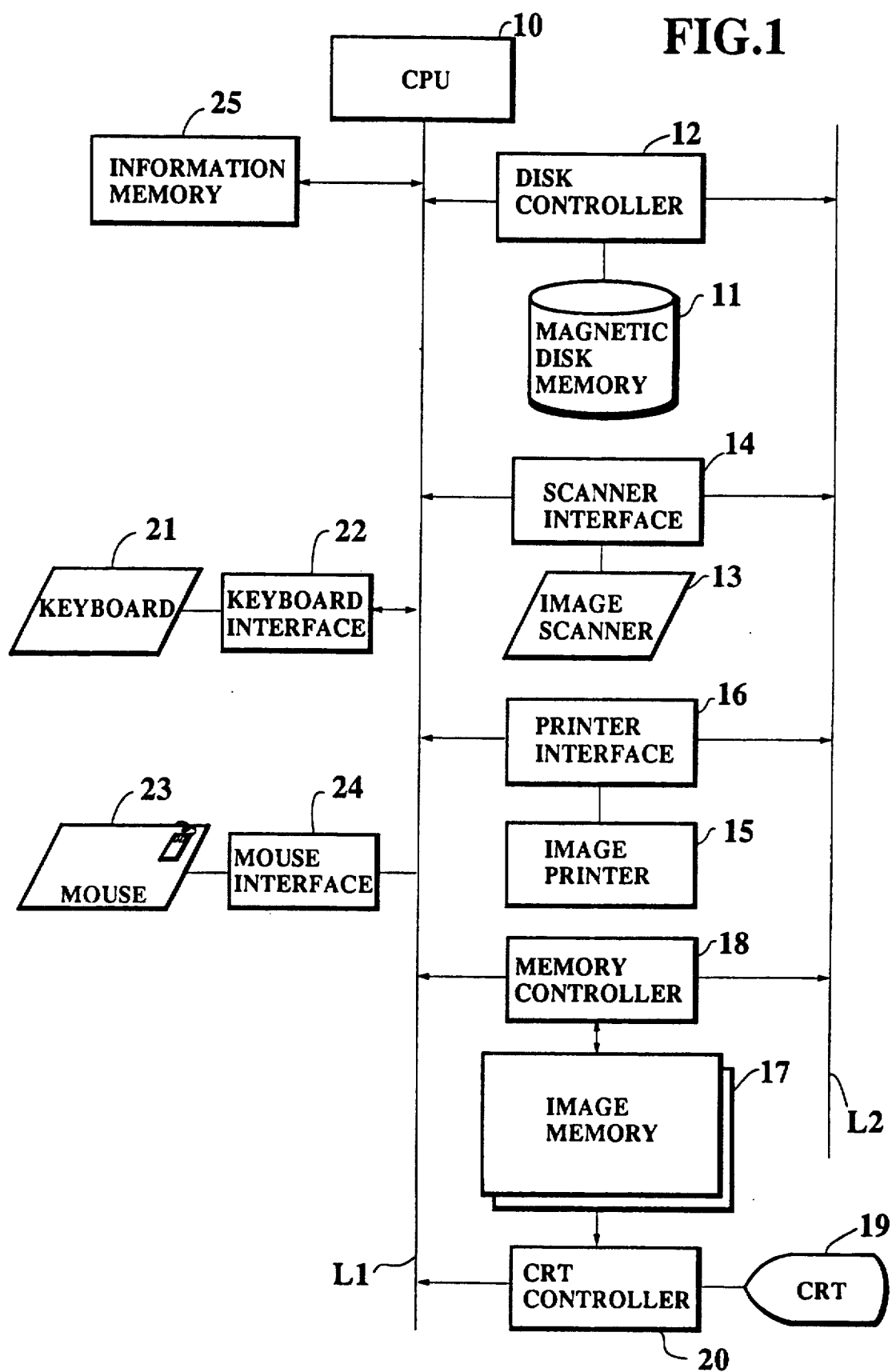
FIG. 1 is a block diagram of one embodiment of an image filing system according to the present invention.

Referring now to FIG. 1, there is shown one embodiment of an image filing system according to the present invention.

In this embodiment, the image data filing system comprises a CPU 10 for controlling the operation of each element of the system; a magnetic disk memory 11 connected with the CPU 10 through a disk controller 12, for storing image data; an image scanner 13 connected with the CPU 10 through a scanner controller 14, for reading an image to be filed in the system; an image printer 15 connected with the CPU 10 through a printer interface 16, for printing an image filed in the system; an image memory 17 connected with the CPU 10 through a memory controller 18, for temporarily storing image data; a CRT 19 connected with the CPU 10 and the image memory 17 through a CRT controller 20, for displaying an image temporarily stored in the image memory 17; a keyboard 21 connected with the CPU 10 through a keyboard interface 22, for allowing an operator to enter commands; a mouse 23 connected with the CPU 10 through a mouse interface 24, for allowing an operator to specify a position on the CRT 19; and an information memory 30 for memorizing an information to be utilized in modifying the image in the image memory 17.

The system also has a system bus L1 for connecting the disk controller 12, scanner interface 14, printer interface 16, memory controller 18, CRT controller 20, keyboard interface 22, mouse interface 24, and information memory 25 to the CPU 10; and an image bus L2 for connecting the disk controller 12, scanner interface 14, printer interface 16 and memory controller 18 in order to transmit image data.

In this system, the images to be filed are read by the image scanner 32, and the images read by the scanner are stored in the magnetic disk memory 11 with distinct file names given by an operator through the keyboard 21. The images stored in the magnetic disk memory 11 can be printed out by the image printer 15, or displayed on the CRT 19 by temporarily storing the image in the image memory 17.

Figure 2:
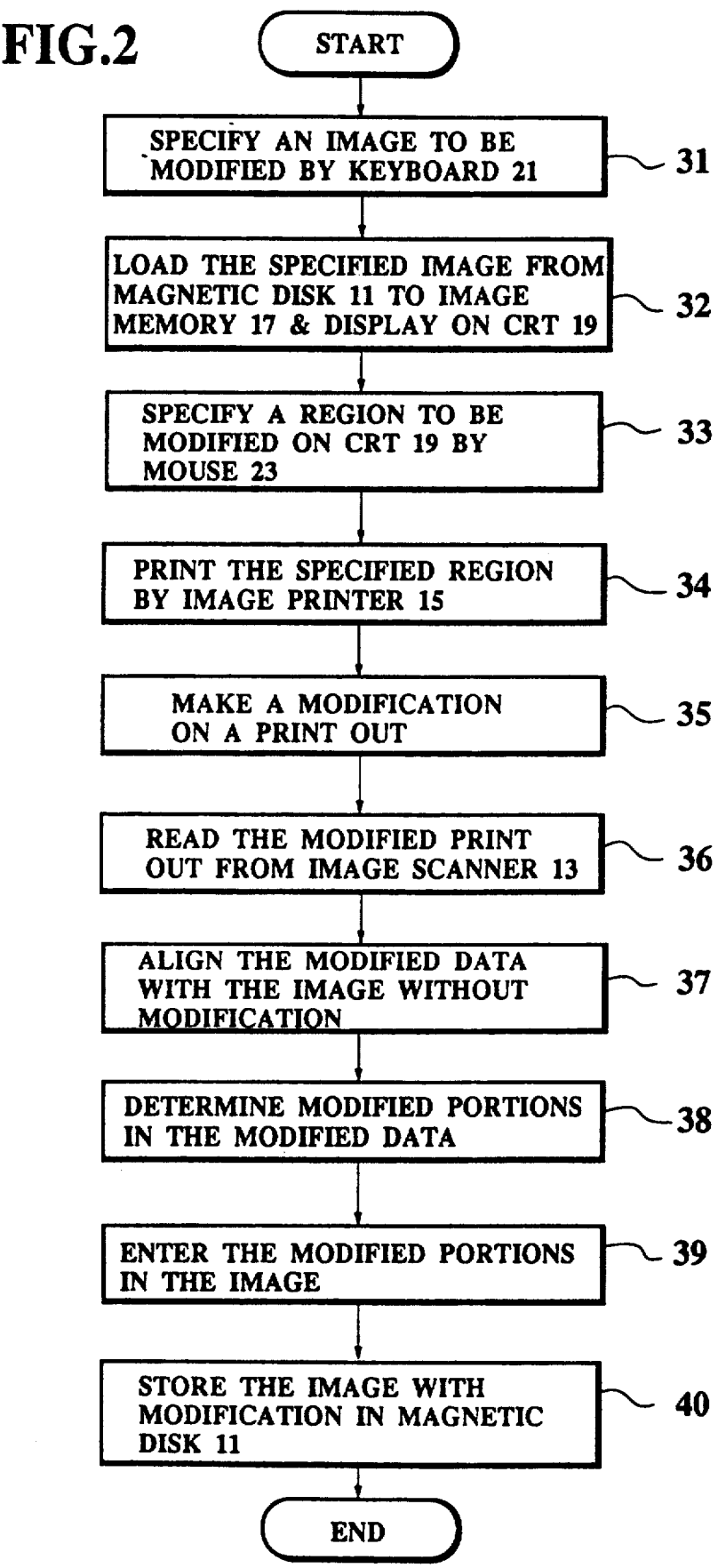
FIG. 2 is a flow chart for the operation of the image data filing system of FIG. 1.

In this embodiment, the modification of the image filed in the system can be accomplished according to a flow chart of FIG. 2, as follows.

First, at the step 31, an operator specifies an image to be modified by entering the file name of this image from the keyboard 21.

In response, at the step 32, the image filed with the entered file name is read out from the magnetic disk memory 11, loaded into a zeroth operational area of the image memory 17, and displayed on the CRT 19.

Then, at the step 33, the operator specifies a region to be modified in the image displayed on the CRT 19 by using the mouse 23.

Figure 3:
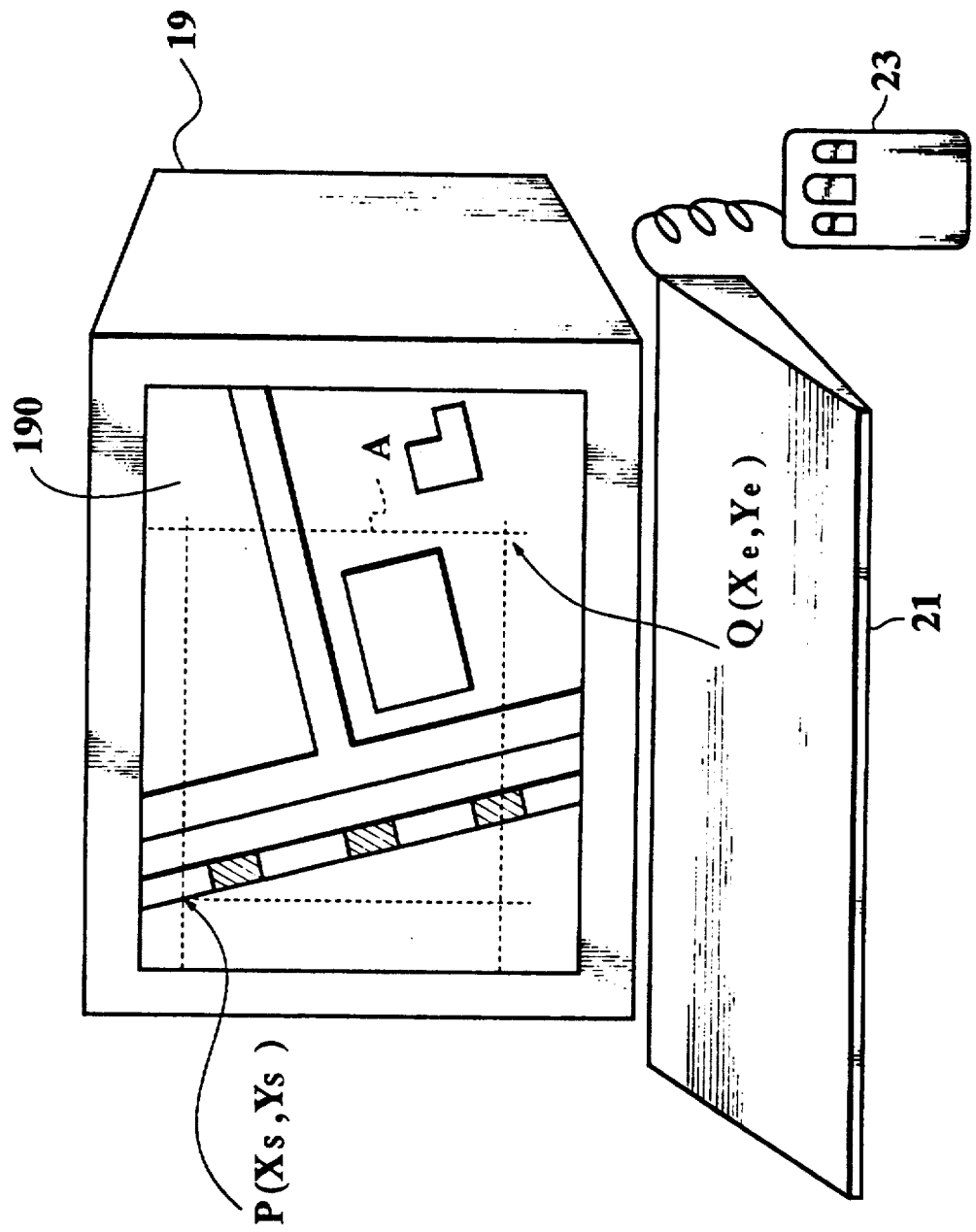
FIG. 3 is a perspective view of a CRT used in the image filing system of FIG. 1, for explaining an operation on the displayed image.

Namely, as shown in FIG. 3, a region A on a display screen 190 of the CRT 19 is specified by pointing an upper left corner P which has a coordinate (Xs, Ys) on the display screen 190 and a lower right corner Q which has a coordinate (Xe, Ye) on the display screen 190, using the mouse 23. The coordinates (Xs, Ys) and (Xe, Ye) of the pointed corners P and Q are then memorized in the information memory 25.

Figure 4:
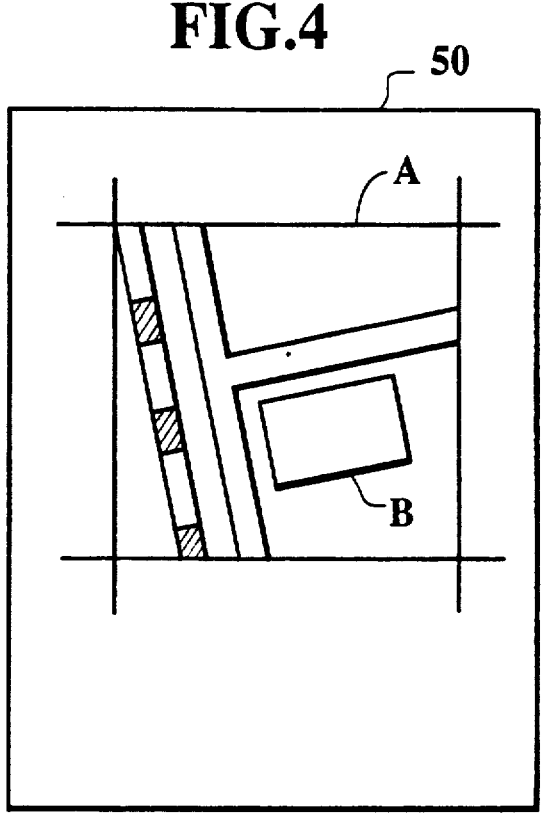
FIG. 4 is an illustration of a hard copy of a region to be modified, obtained by the image data filing system of FIG. 1 before the modification is entered.

Next, at the step 34, the image inside the specified region A is printed out by the image printer 15, so as to obtain a hard copy (print out) 50 of the image inside the specified region A as shown in FIG. 4.

Figure 5:
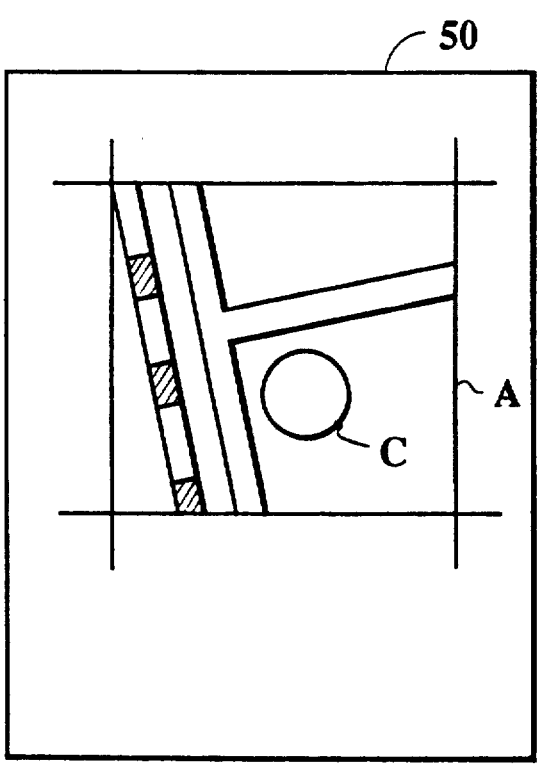
FIG. 5 is an illustration of a hard copy of a region to be modified, obtained by the image data filing system of FIG. 1 after the modification is entered.

Then, at the step 35, the operator makes a desired modification on this print out 50. For example, the operator may replace a box B inside the region A shown in FIG. 4 by a circle C, as shown in FIG. 5.

Figure 6:
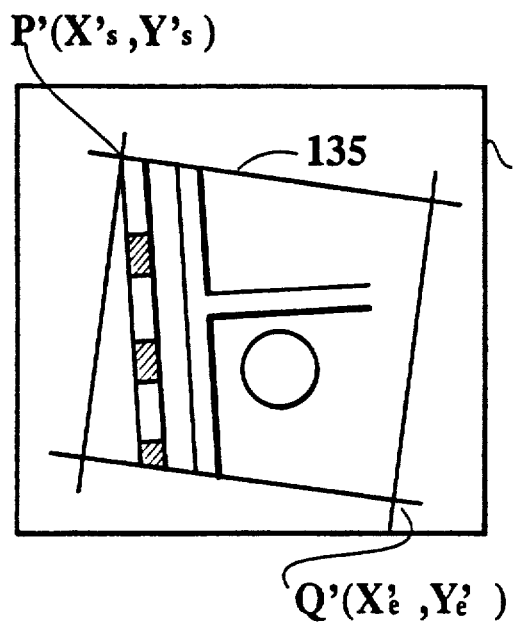
FIG. 6 is an illustration of a scanned image of a region to be modified, obtained by the image data filing system of FIG. 1 before the alignment.

When the desired modification is entered on the hard copy 50, next at the step 36, this hard copy 50 incorporating the modification is read by the image scanner 13 and stored in a first operational area of the image memory 17. Here, as indicated on FIG. 6, an upper left corner P' of a perimeter 135 of the scanned image has a coordinate (Xs', Ys') in the first operational area 171, which is in general different from the coordinate (Xs, Ys) of the corner P of the region A on the display screen 190, while a lower right corner Q' of the perimeter 135 of the scanned image has a coordinate (Xe', Ye') in the first operational area 171, which may be different from the coordinate (Xe, Ye) of the corner Q of the region A on the display screen 190.

Figure 7:
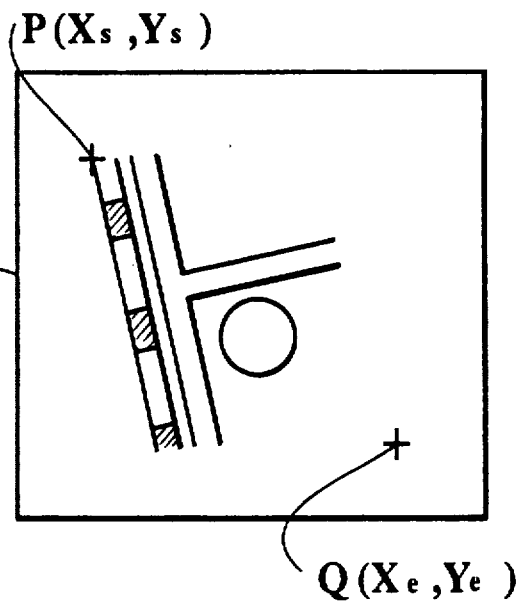
FIG. 7 is an illustration of a scanned image of a region to be modified, obtained by the image data filing system of FIG. 1 after the alignment.

Next, at the step 37, the scanned image is aligned with the image before the modification by identifying the corners P and Q of the region A memorized in the information memory 25 and the corners P' and Q' of the perimeter 135 of the scanned image, in order to obtain an aligned image as shown in FIG. 7 in a second operational area 172 of the image memory 17. Such an alignment can be accomplished by any known method such as that utilizing the affine transformation.

Figure 8:
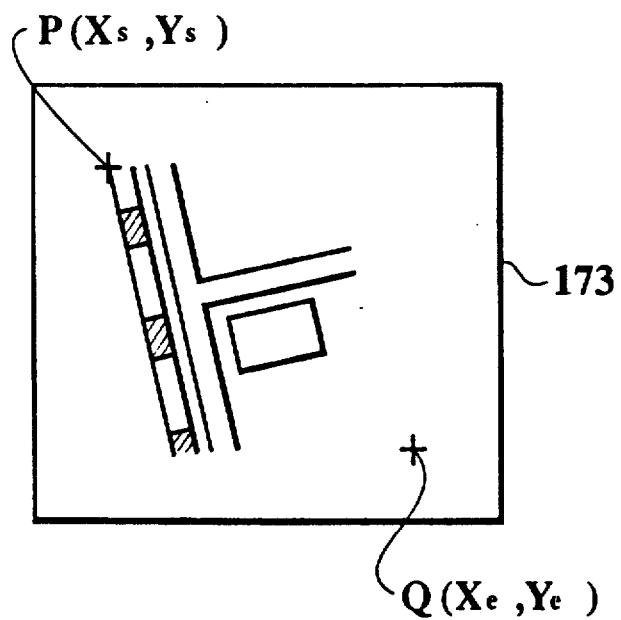
FIG. 8 is an illustration of a region to be modified, obtained by the image data filing system of FIG. 1 without the modification.
Figure 9:
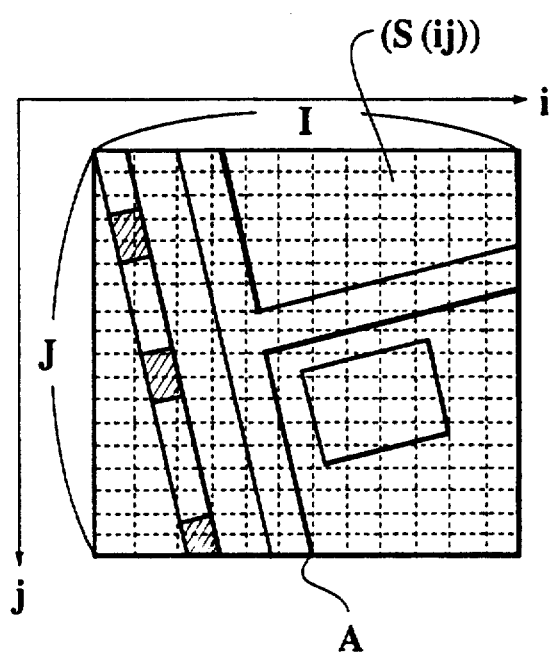
FIG. 9 is an illustration of a region to be modified before the modification is entered, with subdivision indicated.
Figure 10:
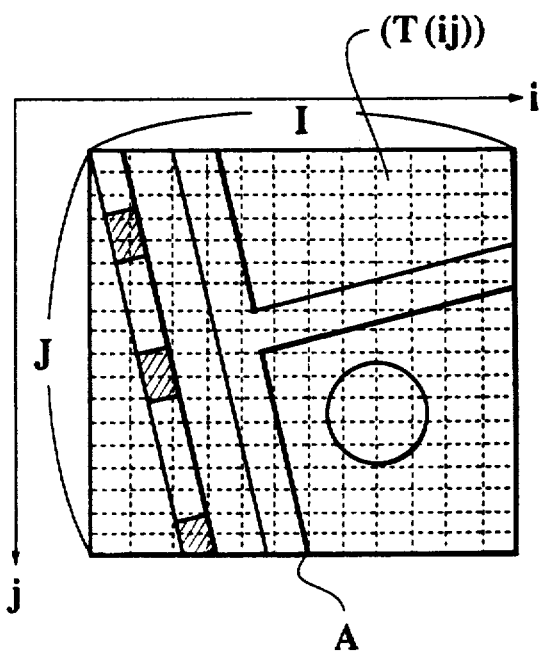
FIG. 10 is an illustration of a region to be modified after the modification is entered, with subdivision indicated.
Figure 11:
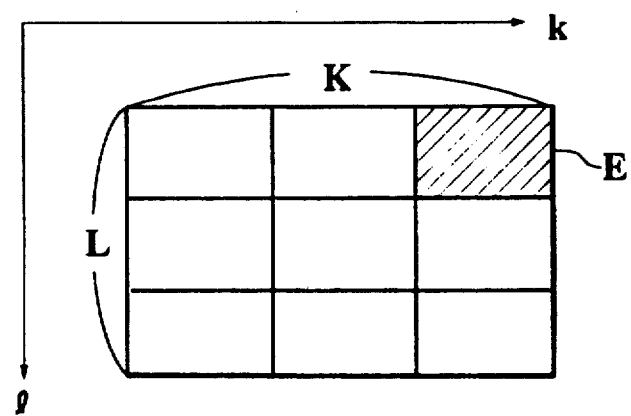
FIG. 11 is an illustration of picture elements comprising each subdivision of the region to be modified, shown in FIGS. 9 and 10.

Then, at the step 38, modified portions inside the region A are determined by comparing the image inside the region A with and without the modification. This is accomplished as follows. Namely, the image inside the region A without the modification as shown in FIG. 8 is loaded into a third operational area 173 of the image memory 17. Then, each of the images inside the region A without the modification is subdivided into I×J subregions S(i, j) as shown in FIG. 9 in the third operational area of the image memory 17, while the image inside the region A with the modification is subdivided into I×J subregions T(i, j) as shown in FIG. 10 in the second operational area of the image memory 17. Then, as shown in FIG. 11, each one of the subregions S(i, j) and T(i, j) is regarded as being constructed by K×L picture elements E, each of which indicating a particular image density value, such as 0 or 1 in a case of a binary image. Finally, a similarity defined by an expression:

$$\eta_{ij} = \frac{\sum_k \sum_l |S_{ij}(k, l) - T_{ij}(k, l)|}{K \times L}$$

is calculated, and those subregions T(i, j) for which this similarity $\eta_{ij}$ are greater than a prescribed threshold value is considered as the modified portions.

Figure 12:
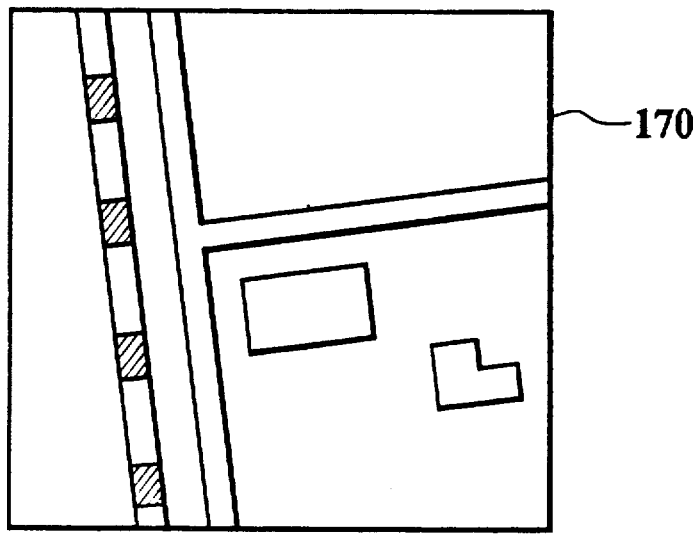
FIG. 12 is an illustration of an image filed in the image data filing system of FIG. 1 before the modification is entered.
Figure 13:
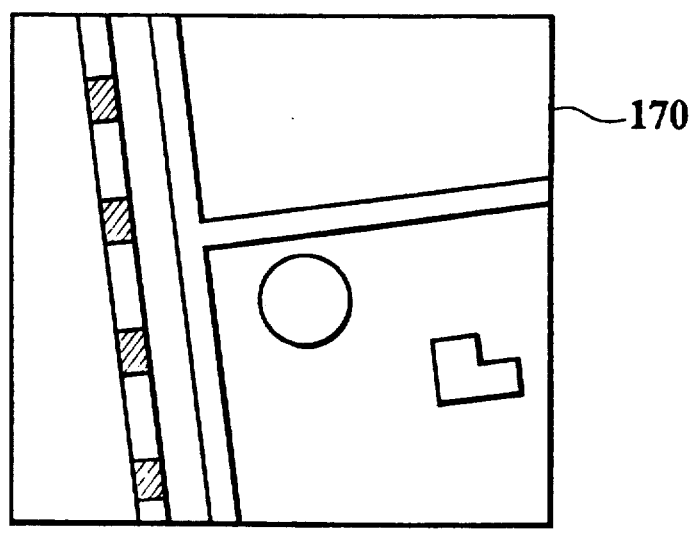
FIG. 13 is an illustration of an image filed in the image data filing system of FIG. 1 after the modification is entered.

Next, at the step 39, the image of the modified portions inside the region A is entered into the image without the modification shown in FIG. 12 which is stored on the zeroth operational area 170 of the image memory 17, so as to obtained the image incorporating the modification shown in FIG. 13 on the zeroth operational area 170 of the image memory 17.

Finally, at the step 40, the obtained image incorporating the modification is stored in the magnetic disk memory 11 by replacing the image without the modification stored previously.

Thus, according to this embodiment, the modification is made on the hard copy 50 obtained from the image filed in the system, and then the modification is entered in the image filed in the system by reading the hard copy 50 with the modification entered by the image scanner 13. Since it is much easier and more accurate for an average operator to work on the print out rather than on the display, this manner of the present embodiment facilitates an easy and accurate modification in the image data filing system.

It is to be noted that the determination of the modified portions in the above embodiment is not necessarily incorporated, although this feature allows to minimize the amount of replacement of data so that an unnecessary deterioration of data in the unmodified region can be prevented.

Figure 14:
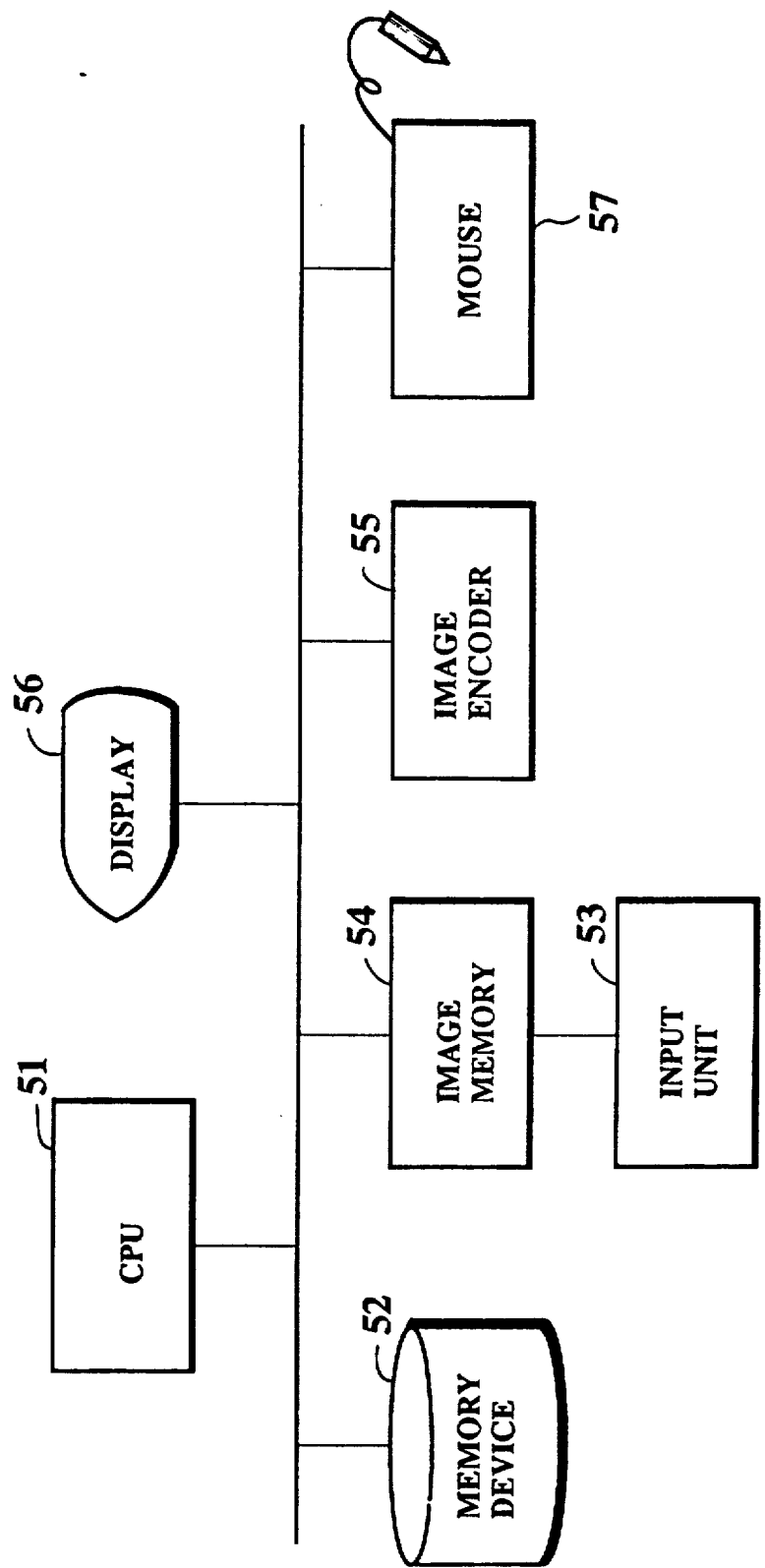
FIG. 14 is a block diagram of another embodiment of an image filing system according to the present invention.

Referring now to FIG. 14, another embodiment of an image data filing system according to the present invention will be described.

This embodiment concerns with a case in which the images are filed in the system in forms of coded image data, rather than in forms of image data as in the previous embodiment.

In this embodiment, the image data filing system comprises a CPU 51 for controlling an operation of each element of the system, a memory device 52 for storing coded image data, an input unit 53 for entering a modified image to be entered into the image filed in the system, an image memory 54 for temporarily storing the modified image entered from the input unit 53, an image encoder 55 for encoding the image stored in the image memory 54, a CRT 56 for displaying the image stored in the memory device 52 or the image memory 54, and a mouse 23 for allowing an operator to specify a position on the CRT 56. These elements are interconnected through a system bus 58.

In this embodiment, the modification of the image filed in the system can be accomplished according to a flow chart of FIG. 15, as follows. Here, it is assumed that the modified image to be entered is obtained by taking a hard copy of a region to be modified in a manner identical to that described above for the previous embodiment.

First, at the step 61, the modified image specifying the modification to be made on the image stored in the memory device 52 is entered from the input unit 53 into the image memory 54. This is achieved for example by reading a hard copy on which a desired modification is made by means of an image scanner.

Then, at the step 62, the modified image on the image memory 54 is encoded by the image encoder 55.

Then, at the step 63, the original image stored in the memory device 52 is displayed on the CRT 56, and the operator specifies a modification region into which the modified image is to be entered by using the mouse 57.

Then, at the step 64, in response to the modification region specified at the step 63, the original image is separated into the modification region, a modification region perimeter, and an unmodification region.

Next, at the step 65, the encoded modified image obtained by the image encoder 55 is displayed on the CRT 56, and the operator specifies the modification region perimeter on this encoded modified image by using the mouse 57.

Then, at the step 66, a size of the modified image is determined such that the modified image can be fitted into the modification region specified on the original image. This can be achieved by identifying corresponding features at the modification region perimeter on the original image and the modified image.

Next, at the step 67, from the size of the modified image determined at the step 66, a rate of contraction (or magnification) of the modified image is determined, and whether the modified image is to be contracted more than a prescribed threshold rate is determined. Here, the prescribed threshold rate indicates a rate such that when an image is contracted at this rate, the figures in the image will have a lowest admissible resolution.

If the rate of contraction is not more than the prescribed threshold rate, then, next at the step 70, the modified image in a size determined at the step 66 is entered into the modification region of the original image.

On the other hand, if the rate of contraction is more than the prescribed threshold rate, then, at the step 68, whether there is a sufficient blank region in unmodification region of the original image to make a room for expanding the modification region such that the modified image contracted at the prescribed threshold rate can be fitted into the expanded modification region is determined.

If such a blank region is available, then at the step 69, the figures in the unmodification region is displaced into this blank region so as to make a room for expanding the modification region such that the modified image contracted at the prescribed threshold rate can be fitted into the expanded modification region, and the modification region is expanded such that the modified image contracted at the prescribed threshold rate can be fitted into the expanded modification region. Then, at the step 70, the modified image contracted at the prescribed threshold rate is entered into the expanded modification region of the original image.

On the other hand, if such a blank region is not available, then at the step 71, the operator is notified of the impossibility of entering this modification.

Thus, according to this embodiment, even when the images are filed in forms of coded image data, an easy and accurate modification can be facilitated in the image data filing system.

It is to be noted that many modifications and variations of the above embodiments may be made without departing from the novel and advantageous features of the present invention. Accordingly, all such modifications and variations are intended to be included within the scope of the appended claims.

What is claimed is:

1. A method of modifying image data in an image data filing system, comprising the steps of:

specifying an image to be modified among images filed in the system;

displaying the specified image to be modified;

specifying a region to be modified on the displayed image to be modified, said region being a part of the image to be modified formed locally around a modification to be made on the image to be modified;

obtaining a hard copy of the specified region to be modified;

making a modification on the obtained hard copy of the specified region to be modified to obtain a modified image;

reading the modified image from the hard copy;

changing a size of the modified image read from the hard copy such that the modified image can be fitted into the region of the image to be modified;

aligning the modified image in changed size with the region of the image to be modified by adjusting an orientation of the modified image such that corners of the modified image are aligned with corners of the region of the image to be modified; and replacing the region of the image to be modified with the aligned modified image, by subdividing the region of the image to be modified into a plurality of subregions, detecting modified portions within the modified image by calculating a similarity for each subregion of the region of the image to be modified, with and without the modification, and substituting only the detected modified portions of the modified image into the region of the image to be modified.

2. The method of claim 1, wherein the images are filed in the system in forms of coded image data.

3. An image data filing system, comprising:

means for storing image data of images filed in the system;

means for specifying an image to be modified among images filed in the system;

means for displaying the specified image to be modified;

means for specifying a region to be modified on the displayed image to be modified, said region being a part of the image to be modified formed locally around a modification to be made on the image to be modified;

means for obtaining a hard copy of the specified region to be modified on which the modification is to be made, in order to obtain a modified image;

means for reading the modified image from the hard copy;

means for changing a size of the modified image read from the hard copy such that the modified image can be fitted into the region of the image to be modified;

means for aligning the modified image in changed size with the region of the image to be modified by adjusting an orientation of the modified image such that the corners of the modified image are aligned with the corners of the region of the image to be modified; and means for replacing the region of the image to be modified by the aligned modified image, by means for subdividing the region of the image to be modified into a plurality of subregions, means for detecting modified portions within the modified image by calculating a similarity for each subregion of the region to be modified, with and without the modification, and means for substituting only the modified portions of the modified image detected by the detecting means into the region of the image to be modified.

4. The system of claim 3, wherein the images are filed in the system in forms of coded image data.

* * * * *